3,168,808
COMBUSTION IMPROVEMENT DEVICE
Joseph J. Lovingham, Madison, and Henry A. Jatczak, Roseland, N.J., assignors to Thiokol Chemical Corporation, Bristol, Pa., a corporation of Delaware
Filed Mar. 8, 1961, Ser. No. 94,396
5 Claims. (Cl. 60—35.6)

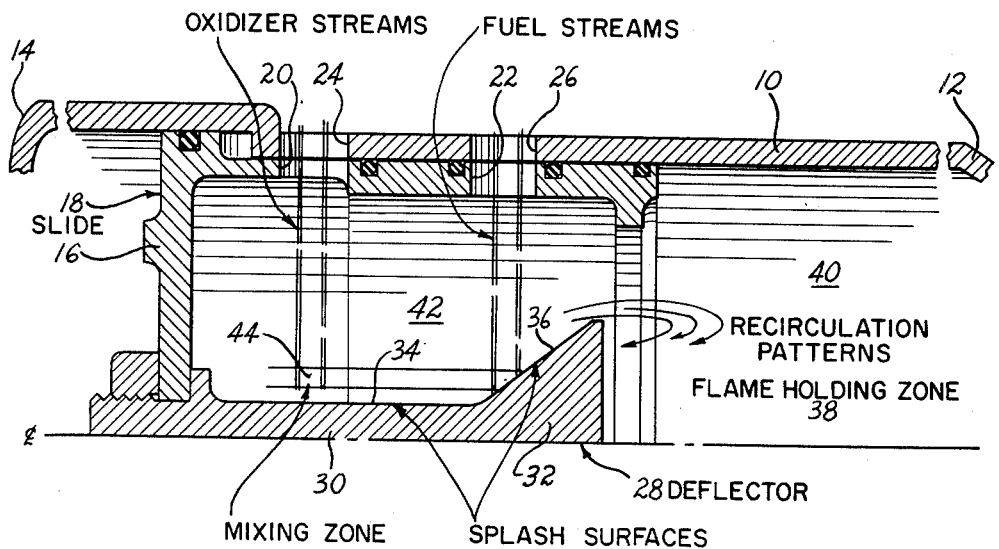

This invention relates generally to rocket motors and more particularly to a device for increasing the combustion efficiency of rocket propellant injectors.

As is well known, maximum rocket performance for a given design type is dependent upon many factors of which a number are critical and directly affect overall operation. Of real importance among these factors is the combustion efficiency of the rocket motor and its improvement is the object of unceasing research and exhaustive tests.

Accordingly, the main object of the present invention is to provide a device for increasing the combustion efficiency of rocket motors.

An important object of the present invention is to provide a device for increasing the combustion efficiency of the types of rocket injectors which inject the rocket propellants toward the axis of the combustion chamber.

Another important object of the present invention is to provide a deflector for radially injected rocket propellants which will ensure a more complete combustion thereof.

A further important object of the present invention is to provide a deflector for rocket propellants which will also function as a flameholder therefor.

A still further important object of the present invention is to provide a deflector for rocket propellants which will increase the combustion efficiency thereof and which may be readily incorporated in conventional combustion chambers of the radial injection type with a minimum of difficulty despite limitations of design, available space and the arrangement thereof.

Other objects and advantages of the present invention will become apparent during the course of the following description.

In its broadest respects, the invention contemplates a device which will effect the creation of a high intensity splash mixing zone in a combustion chamber to enhance the combustion of hypergolic and other propellants.

In the drawings we have shown one embodiment of the invention in this showing:

The single figure is a fragmentary, central, longitudinal sectional viewing showing the deflector in operative position in a combustion chamber.

Referring to the drawings, numeral 10 denotes the inner wall of a combustion chamber terminating at its downstream end in an exhaust nozzle 12. The upstream end may be closed by the combusiton chamber head 14 or, as shown for purposes of illustration of the adaptability of the device to various design types, by the wall 16 of an injector slide 18 having propellant inlet ports 20 and 22 shown in alignment respectively with radial propellant injection ports 24 and 26 formed in the combustion chamber wall 10 in a second position of slide 18 and closed and not in alignment when slide 18 is in a first position.

A deflector 28 comprising a cylinder 30 terminating in a cone 32 is mounted coaxially of the combustion chamber in the head 14 or slidably with the injector slide 18, and in either case extends downstream beyond the propellant injection port 26 when open. The peripheral surfaces 34 and 36 of the cylinder 30 and of the cone 32 respectively comprise propellant splash surfaces and the latter extends at an optimum angle of 45 degrees to the combustion chamber axis although this may be modified in special circumstances.

It is to be noted that the cone 32 acts as a flameholder to define a flame holding zone 38 in the combustion chamber 40 and also defines the injection chamber 42.

When the rocket motor is in operation, fuel and oxidizer may be injected separately through either of the radial injection ports 24 and 26. Assuming that fuel is injected radially through the port 26, it enters the injection chamber 42 radially and impinges on the splash surface 36 of the cone 32 and is deflected forwardly or upstream into the oxidizer stream which enters the port 24 radially to impinge upon the splash surface 34.

The deflection of the fuel stream into the oxidizer stream at 44 creates a high intensity splash mixing zone which enhances the combustion of hypergolic propellants and the mixing of other types. The high intensity splash mixing is further enhanced by the passing of the mixture back through the radially moving oxidizer and fuel streams and the mixture splashed from the surfaces 34 and 36. The consequent highly efficient mixing of the propellants effects a markedly improved combustion efficiency determined by tests of approximately 6 percent.

It will now be readily apparent that the cylinder-cone deflector provides an important increase in combustion efficiency and in performance in effectively promoting propellant mixing by diverting the propellant streams in the opposite direction from the combustion chamber nozzle to increase "stay-time" of the recirculating mixture, and also, as contrasted with a streamline shape, serves as a bluff body flameholder.

It is to be understood that the form of our invention herewith shown and described is to be taken as a preferred example of the same and that various changes in the shape, size and arrangement of parts may be resorted to without departure from the spirit of the invention or the scope of the subjoined claims.

We claim:

1. In combination with a combustion chamber having a head, an exhaust nozzle, and axially spaced propellant injection orifices formed in its wall, a deflector mounted in the head concentrically of said chamber, said deflector extending rearwardly from the head and toward the nozzle and having cylindrical and conical portions respectively in alignment with the spaced propellant orifices to intercept and deflect propellant streams radially injected into the chamber toward said head to effect a mixing thereof before their flow toward the nozzle.

2. The combination recited in claim 1 wherein said conical portion defines an injection chamber within said combustion chamber.

3. The combination recited in claim 1 wherein said deflector is spaced from the wall of said combustion chamber and said conical portion acts as a bluff body flameholder to define a flame holding zone therein.

4. The combination recited in claim 3 wherein said conical portion also defines an injection chamber within said combustion chamber.

5. In combination with a combustion chamber having a head, an exhaust nozzle, and at least two spaced, axially aligned, radially disposed propellant injection orifices formed in its wall; an elongated deflector mounted in the head and concentrically of the head and of the chamber, said deflector extending toward the nozzle and having cylindrical and conical portions respectively in radial alignment with the upstream orifice and the downstream orifice to intercept and effect a splashing and mixing of propellant radially entering said orifices; said conical portion deflecting the propellant forwardly through the mixed propellant and through the propellant entering the upstream orifice to further mix the injected propellant before it is diverted rearwardly toward the exhaust nozzle to effect a further and final mixing of the said splashed and deflected propellants.

References Cited in the file of this patent

UNITED STATES PATENTS

| | | |
|---|---|---|
| 2,555,082 | Goddard | May 29, 1951 |
| 2,722,100 | Goodard | Nov. 1, 1955 |
| 2,810,259 | Burdett | Oct. 22, 1957 |
| 2,887,844 | Coty | May 26, 1959 |
| 2,992,528 | Ozanich et al. | July 18, 1961 |